Sept. 21, 1948.  D. L. HARFORD  2,449,811

MULTIVOLTAGE DRY BATTERY

Filed Aug. 28, 1943

INVENTOR.
Dwight L. Harford
BY
F. Bascom Smith
ATTORNEY.

Patented Sept. 21, 1948

2,449,811

UNITED STATES PATENT OFFICE 2,449,811

MULTIVOLTAGE DRY BATTERY

Dwight L. Harford, Downey, Calif., assignor to A. Parley Johnson, Downey, Calif.

Application August 28, 1943, Serial No. 500,311

3 Claims. (Cl. 136—173)

1

This invention relates to a unit dry cell battery case or receptacle and while capable of general use is particularly adapted for portable and other types of lighting devices.

One object of the present invention is to provide a unit dry cell battery receptacle of novel construction whereby different voltages may be obtained from the battery without removing or altering the positions of the cells in the receptacle.

Another object is to provide a unit dry cell battery receptacle having novel switch and current conducting means whereby different voltages may be obtained from the battery by using all or part only of the cells.

Another object is to provide a novel and inexpensive receptacle for supporting a plurality of dry cells which is open on all sides to facilitate inserting and removal of the cells, and so constructed that each cell is self-supporting therein.

Another object is to provide a unit dry cell battery receptacle which, through provision of novel arrangement of current conducting means, utilizes standard flashlight cells having cardboard or other insulating covers thereon.

These and other objects of the present invention will appear as the following description thereof proceeds, and in order to more clearly understand said invention reference may be had to the accompanying drawing which illustrates one embodiment thereof and wherein like reference characters designate like parts throughout the several views.

Figure 1:
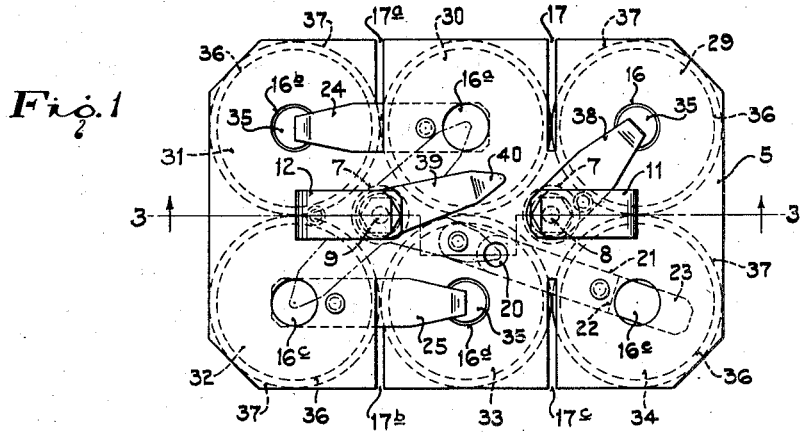
Fig. 1 is a top plan view of a unit cell battery receptacle embodying the present invention.

As herein shown, the unit cell battery receptacle is, in accordance with the present invention, comprised by a top or cover plate 5 and a bottom or base plate 6 (Fig. 3) supported in spaced relation by two tubes 7, and secured together by two brass bolts or threaded posts 8 and 9 that extend upwardly through said plates and tubes and are provided on their upper ends with brass nuts 10. Plates 5 and 6, and tubes 7, are preferably formed of vulcanzed fibre, and "Tenite" tubing, respectively, but it will be understood that said plates and tubes may be formed of any other suitable non-conducting material.

Riveted or otherwise suitably secured to the

2 upper surface of top plate 5 are two longitudinally spaced spring brass strips 11 and 12 which are bent upwardly and inwardly at an angle toward each other. Strips 11 and 12 are engaged by the nuts 10 and provided with suitable openings through which the upper ends of posts 8 and 9 extend. Strips 11 and 12 form positive and negative contacts or terminals for connecting the battery, as illustrated diagrammatically in Fig. 3, through leads 13 and 14 with the lamp 15 of a flashlight, or a portable lantern of the general type disclosed in my United States Patent No. 2,228,009, granted January 7, 1941.

Top plate 5 is provided with six equally spaced circular openings 16, 16a, 16b, 16c, 16d and 16e, and with four equally spaced slots 17, 17a, 17b and 17c (Fig. 1), and bottom plate 6 is provided with six similar openings 18, 18a, 18b, 18c, 18d and 18e, and with five similar slots 19, 19a, 19b, 19c and 19d (Fig. 2) for purposes to be hereinafter described. Plate 5 is further provided with a smaller opening 20, and with a groove 21 on the underside thereof which traverses said opening and opens into the opening 16e, the opening 20 and groove 21 being located centrally on a line bisecting post 9 and opening 16e.

Figure 3:
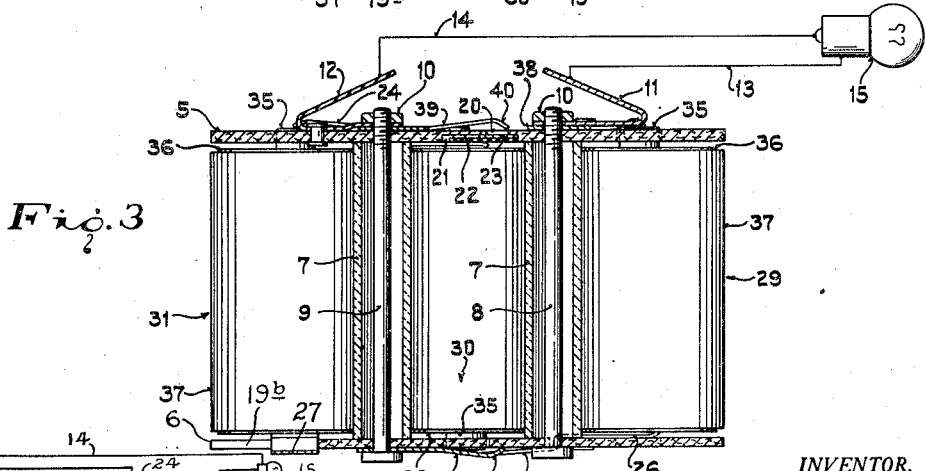
Fig. 3 is a vertical sectional view on the line 3—3 of Fig. 1.

Disposed within the groove 21 and riveted or otherwise suitably secured to top plate 5 is a strip 22 of insulating material, and a spring brass conducting strip 23 which is interposed between said insulating strip and said plate (Figs. 1 and 3). Conducting strip 23 extends along the underside of plate 5 and has one end thereof disposed beneath the opening 20, and the opposite end projecting beyond the corresponding end of the insulating strip 22, and beneath the opening 16e. Riveted or otherwise suitably secured to the underside of plate 5 are two spring brass conducting strips 24 and 25 which project upwardly through the slots 17a and 17b, respectively, and extend along opposite sides of said plate so that corresponding ends of said strips are disposed above the openings 16b and 16d, and opposite ends disposed below the openings 16a and 16c. Riveted or otherwise suitably secured to the upperside of bottom plate 6 are three spring brass conducting strips 26, 27 and 28 which project downwardly through the slots 19, 19b and 19d, respectively, and extend along opposite sides of said plate so that corresponding ends of said strips are disposed below the openings 18a, 18c and 18e, and opposite ends disposed above the openings 18, 18b and 18d.

It is evident from the construction thus far described that the receptacle is preferably adapted to hold six dry cells. These dry cells are indicated at 29, 30, 31, 32, 33 and 34, and are preferably standard 1½ volt flashlight cells, each including a center or positive electrode 35, a zinc casing 36, i. e., the negative pole, and an insulating cardboard cover 37. The cells are inserted at an angle, bottom end first, between the top and bottom plates 5 and 6, and in a manner such that the first, third and fifth cells 29, 31, and 33 are upright, and the second, fourth and sixth or alternate cells 30, 32 and 34 are inverted, that is, bottom end uppermost, and then pressed into position so that the center electrodes of said cells enter the openings 16, 16b and 18d, and 18a, 18c and 18e in said top and bottom plates, respectively, the slots in plates 5 and 6 forming yieldable plate portions to facilitate this operation.

It will thus be noted that when the cells are inserted between top and bottom plates 5, 6 as hereinbefore described, the exposed bottom end of the zinc casing 36 of cell 34 and the center electrode 35 of said cell will engage the conducting strips 23 and 28, respectively, the casing and electrode of cell 33 will engage the strips 28 and 25, respectively, the casing and electrode of cell 32 will engage the strips 25 and 27, respectively, the casing and electrode of cell 31 will engage the strips 27 and 24, respectively, the casing and electrode of cell 30 will engage the strips 24 and 26, respectively, and the casing and electrode of cell 29 will engage the strip 26 and a spring brass conducting strip 38, thus connecting said cells in series beginning with the center electrode 35 of the first or leading cell 29 which is engaged with the strip 38, and ending with the zinc casing 36 of the last or final cell 34 which is engaged with the strip 23. Strip 38 is riveted or otherwise suitably secured to the upperside of top plate 5 and interposed between said plate and the contact strip 11 to connect the latter with the elecrode 35 of cell 29, and provided with a suitable opening through which the post 8 extends. The cells are firmly held between top and bottom plates 5, 6 by the center electrodes engaged in the circular openings in said plates, and by the spring tension of the conducting strips on the bottom ends of said cells.

Novel switch means are provided for completing the circuit to the contact strip 12, said means being movable to various positions to connect all or part only of the cells whereby different voltages may be obtained from the battery without removing or altering the positions of the cells in the receptacle. As herein shown, said switch means are preferably constructed, mounted and operated as follows. Interposed between top plate 5 and contact strip 12 is a spring brass switch arm or conducting member 39 provided at one end with a suitable opening through which the post 9 extends, and at the opposite end with a downwardly projecting portion 40. Arm 39 is rotatable about post 9 as an axis and is of a length such that the free end 40 thereof will be swung through an arc bisecting the openings 16a, 20 and 16c in plate 5. Engaged over post 9 and interposed between bottom plate 6 and the head of said post is a second spring brass switch arm or conducting member 41 having an upwardly projecting free end portion 42. Arm 41 is rotatable about post 9 as an axis and is of a length such that the free end 42 thereof will be swung through an arc bisecting the openings 18b and 18d in plate 6. Arms 39 and 41 are selectively and independently operable to obtain a range of voltage from 3 volts to 9 volts from the battery, one of said arms being disposed in a neutral or "off" position, as indicated in full lines in Figs. 1 and 2, while the other arm is in operative or circuit completing position.

Figure 4:
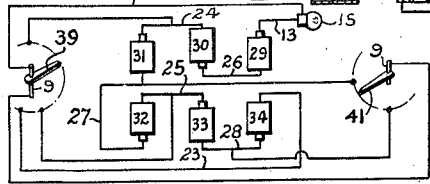
Fig. 4 is a diagrammatic view illustrating the several circuits through the unit cell battery.

Assuming now that it is desired to supply 3 volts to the lamp 15, the switch arm or conducting member 39 is rotated counterclockwise, as viewed in Figs. 1 and 4, until the free end 40 thereof passes through the opening 16a in top plate 5 and into direct electrical contact with the conducting strip 24, as shown in broken lines in Fig. 1 and will be apparent upon reference to Fig. 4. Cells 29 and 30 only will thus be placed in circuit, and the current will pass from the center electrode 35 of cell 29 through strip 38, contact strip 11, lead 13, lamp 15, lead 14, contact 12, switch arm 39 and strip 24, then through cell 30, strip 26 and cell 29.

Should 6 volts be desired, the switch arm or conducting member 39 is rotated clockwise, as viewed in Figs. 1 and 4, until the end 40 thereof passes through the opening 16c in plate 5 and into direct electrical contact with the conducting strip 25, as shown in dotted lines in Fig. 1 and will be apparent upon reference to Fig. 4. Cells 31 and 32 will thus be added to the circuit, the current then passing from the zinc casing 36 of cell 30 through strip 24, cell 31, strip 27, cell 32, strip 25, switch arm 39 and contact strip 12 to lead 14.

To obtain 9 volts using all six cells, the switch arm or conducting member 39 is rotated until the free end 40 thereof passes through the opening 20 in plate 5 and into direct electrical contact with the conducting strip 23, as shown in broken lines in Fig. 1 and will be apparent upon reference to Fig. 4. Cells 33 and 34 will thus be added to the circuit, the current then passing from the zinc casing 36 of cell 32 through strip 25, cell 33, strip 28, cell 34, strip 23, switch arm 39 and contact strip 12 to lead 14.

It will be noted that 3, 6 and 9 volts are obtainable from the battery by simply rotating the switch arm 39 to various selected positions on the top plate 5, as hereinbefore described. Should it be desired to supply a voltage or voltages other than those mentioned above, this may be accomplished through rotation of switch arm 41 to various selected positions on bottom plate 6 and which proceeds as follows. The switch arm 39 is first rotated to a neutral or "off" position, as indicated in full lines in Fig. 1, wherein the free end 40 thereof is engaged only with the upperside of the non-conducting top plate 5. Switch arm 41 is then rotated clockwise, as viewed in Figs. 2 and 4, until the free end 42 thereof passes through the opening 18b in bottom plate 6 and into direct electrical contact with the conducting strip 27, as indicated in broken lines in Fig. 2 and will be apparent upon reference to Fig. 4. Cells 29, 30 and 31 only will thus be placed in circuit producing a combined total of 4½ volts. The current will pass from the center electrode 35 of cell 29 through strip 38, contact strip 11, lead 13, lamp 15, lead 14, contact strip 12, post 9, switch arm 41 and strip 27, then through cell 31, strip 24, cell 30, strip 26 and cell 29.

Figure 2:
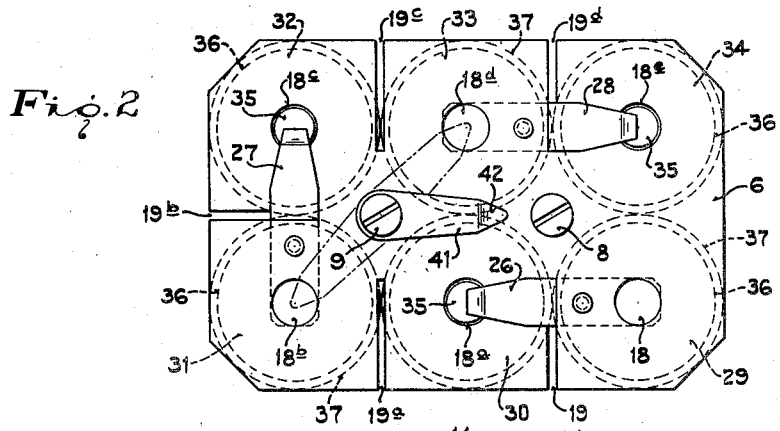
Fig. 2 is a bottom plan view of said receptacle.

When the switch arm 41 is rotated counterclockwise, as viewed in Figs. 2 and 4, the free end 42 thereof will pass through the opening 18d in bottom plate 6 and into direct electrical contact with the conducting strip 28, as indicated in broken lines in Fig. 2 and will be apparent upon reference to Fig. 4. Cells 32 and 33 will thus be added to the circuit, using five cells producing a combined total of 7½ volts. The current will then pass from the zinc casing 36 of cell 31 through strip 27, cell 32, strip 25, cell 33, switch arm 41, post 9 and contact strip 12 to lead 14.

There is thus provided an inexpensive receptacle or case for flashlight cells having insulated covers thereon which is open on all sides to enable inserting and removal of the cells therefrom without having to dismantle the receptacle. Also, different voltages can be quickly obtained from the battery by merely rotating one or the other of two switch arms to preselected positions to obtain the selected voltage whereby the lamp in the "use" circuit can be converted from a lantern or flashlight for ordinary use into a very strong searchlight.

Although only a single embodiment of the invention has been illustrated and described, it is to be expressly understood that the same is not limited thereto. Various changes may be made, as will now be apparent to those skilled in the art, without departing from the spirit and scope of the invention. For example, the switch arm 41 and the contact openings therefor in the base plate 6 may be eliminated, or five cells may only be employed, giving a range of voltage from 3 to 7½ volts when 1½ volt dry cells are used. Also, any metallic conducting material may be used to form the conducting strips, and dry cells of any desired voltage may be employed whereby any desired range of voltage may be obtained from the battery.

What is claimed is:

1. In a dry cell battery, a receptacle, a plurality of upright and inverted dry cells alternately arranged within said receptacle, a plurality of conducting members on said receptacle for connecting said cells in series, a pair of terminals on said receptacle, a conducting member on said receptacle for connecting one of said terminals with the center electrode of the first cell in said series, a switch arm rotatably mounted on said receptacle for selectively connecting the casing of any one of the inverted cells with the other of said terminals and movable to an "off" position, and a second switch arm rotatably mounted on said receptacle for selectively connecting the casing of certain of said upright cells with said other terminal and movable to an "off" position independently of said first-named switch arm, said switch arms being separately employed for placing in circuit any desired number greater than one of said plurality of cells.

2. In a dry cell battery, a receptacle open at all four sides for receiving through said sides a group of removable alternately arranged upright and inverted dry cells, comprising a top plate of non-conducting material having spaced openings therein to receive the center electrodes of said upright cells and to expose the casings of certain of said inverted cells, a bottom plate of non-conducting material having spaced openings therein to receive the center electrodes of said inverted cells and to expose the casings of certain of said upright cells, means disposed centrally of said plates for securing the latter together in spaced relation, resilient conducting members secured to said top plate and having portions extending along opposite surfaces thereof and across the openings therein for releasably connecting the casings of certain of said inverted cells and the center electrodes of adjacent upright cells, resilient conducting members secured to said bottom plate and having portions extending along opposite surfaces thereof and across the openings therein for releasably connecting the casings of said upright cells and the center electrodes of said inverted cells, a pair of terminals on said top plate, a resilient conducting member on said top plate and connected with one of said terminals for releasably connecting the center electrode of the first cell of said group with said terminal, a resilient switch arm rotatably mounted on said top plate and connected with the other of said terminals for selectively connecting the latter with the casings of certain of said inverted cells through the openings in said plate, and a resilient switch arm rotatably mounted on said bottom plate and connected with said other terminal for selectively connecting the latter with the casings of certain of said upright cells through the openings in said plate, said first and second-named switch arms being movable to an "off" position independently of each other and being separately employed whereby any desired number greater than one of said group of cells may be placed in circuit.

3. In a dry cell battery, a receptacle open at all four sides for receiving through said sides a plurality of removable dry cells arranged in two rows of three cells each and such that the first, third and fifth cells are upright and the second, fourth and sixth cells are inverted, comprising a cover plate of non-conducting material having spaced openings therein to receive the center electrodes of said upright cells, said plate also having openings disposed above the second and fourth cells and to one side of the sixth cell, a base plate of non-conducting material having spaced openings therein to receive the center electrodes of said inverted cells and other openings disposed below the third and fifth cells, means disposed centrally of said plates for securing and holding the latter in spaced relation, resilient conducting strips secured to said cover plate and having portions extending across opposite surfaces thereof and across certain of said openings therein for releasably engaging the bottoms of the casings of the second and fourth cells and the electrodes of the third and fifth cells, respectively, a resilient conducting strip secured to the underside of said cover plate for releasably engaging the bottom of the casing of the sixth cell and extending across the opening disposed in said cover plate at one side of said sixth cell, resilient conducting strips secured to said base plate and having portions extending across opposite surfaces thereof and across the openings therein for releasably engaging the bottoms of the casings of the first, third, and fifth cells and the electrodes of the second, fourth and sixth cells, respectively, a pair of resilient terminals on said cover plate, a resilient conducting strip on said cover plate and connected with one of said terminals for releasably connecting the electrode of the first cell with said terminal, a resilient switch arm rotatably mounted on said cover plate and connected with the other of said terminals, said switch arm being movable into engagement with said first and second-named conducting strips through the openings in said cover plate for selectively connecting the second, fourth and sixth cells with said other terminal, and a resilient switch arm rotatably mounted on said base plate and connected with said other terminal, said last-named switch arm being movable into engagement with certain of the conducting strips on the base plate through the openings in said plate for selectively connecting the third and fifth cells with said other terminal, and said switch arms being movable to an "off" position independently of each other and being separately employed whereby any desired number greater than one of said plurality of cells may be placed in circuit.

DWIGHT L. HARFORD.

REFERENCES CITED

The following references are of record in the file of this patent:

UNITED STATES PATENTS

| Number | Name | Date |
| --- | --- | --- |
| 984,068 | Brandon | Feb. 14, 1911 |
| 1,316,567 | Fertman et al. | Sept. 23, 1919 |
| 1,530,206 | Saager | Mar. 17, 1925 |
| 1,546,359 | Baird | July 21, 1925 |
| 1,583,517 | Barany | May 4, 1926 |
| 1,604,872 | Baird | Oct. 26, 1926 |
| 1,606,391 | Schulte | Nov. 9, 1926 |
| 1,879,623 | Jones | Sept. 27, 1932 |
| 2,014,832 | Burgess | Sept. 17, 1935 |
| 2,117,692 | Atkins | May 17, 1938 |
| 2,212,054 | Spicer | Aug. 20, 1940 |

FOREIGN PATENTS

| Number | Country | Date |
| --- | --- | --- |
| 377,925 | Germany | June 29, 1923 |
| 465,689 | Great Britain | May 13, 1937 |
| 482,550 | Great Britain | Mar. 31, 1938 |